United States Patent
Guerinoni et al.

(10) Patent No.: US 12,422,280 B2
(45) Date of Patent: *Sep. 23, 2025

(54) METHOD FOR CORRECTING GYROSCOPE DEMODULATION PHASE DRIFT

(71) Applicant: STMICROELECTRONICS S.r.l., Agrate Brianza (IT)

(72) Inventors: Luca Guerinoni, Alzano Lombardo (IT); Gabriele Gattere, Castronno (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 132 days.

This patent is subject to a terminal disclaimer.

(21) Appl. No.: 18/314,650

(22) Filed: May 9, 2023

(65) Prior Publication Data
US 2023/0280189 A1 Sep. 7, 2023

Related U.S. Application Data

(63) Continuation of application No. 17/460,030, filed on Aug. 27, 2021, now Pat. No. 11,668,585.

(51) Int. Cl.
*G01C 25/00* (2006.01)
*G01C 19/72* (2006.01)

(52) U.S. Cl.
CPC ......... *G01C 25/005* (2013.01); *G01C 19/726* (2013.01)

(58) Field of Classification Search
None
See application file for complete search history.

(56) References Cited

U.S. PATENT DOCUMENTS

| | | | |
|---|---|---|---|
| 6,553,833 | B1 | 4/2003 | Funk et al. |
| 7,523,663 | B2 | 4/2009 | Willig et al. |
| 9,310,202 | B2 | 4/2016 | Lin |
| 9,863,781 | B2 | 1/2018 | Bauer et al. |
| 9,909,873 | B2 | 3/2018 | Rocchi |
| 9,976,858 | B2 | 5/2018 | Andersson et al. |
| 10,371,520 | B2 | 8/2019 | Andersson et al. |
| 11,340,069 | B2 | 5/2022 | Guerinoni et al. |
| 2018/0017387 | A1* | 1/2018 | Cassagnes ......... G01C 19/5755 |
| 2019/0120657 | A1 | 4/2019 | Senkal et al. |
| 2020/0278205 | A1 | 9/2020 | Kraver |
| 2021/0033396 | A1 | 2/2021 | Scafidi et al. |
| 2023/0068616 | A1 | 3/2023 | Guerinoni et al. |

FOREIGN PATENT DOCUMENTS

CN 114006616 A 2/2022

* cited by examiner

*Primary Examiner* — Lisa M Caputo
*Assistant Examiner* — Cynthia L Davis
(74) *Attorney, Agent, or Firm* — Seed IP Law Group LLP

(57) ABSTRACT

A gyroscopic sensor unit detects a phase drift between a demodulated output signal and demodulation signal during output of a quadrature test signal. A delay calculator detects the phase drift based on changes in the demodulated output signal during application of the quadrature test signal. A delay compensation circuit compensates for the phase drift by delaying the demodulation signal by the phase drift value.

20 Claims, 8 Drawing Sheets

METHOD FOR CORRECTING GYROSCOPE DEMODULATION PHASE DRIFT

BACKGROUND

Technical Field

The present disclosure generally relates to gyroscopes. The present disclosure relates more particularly to detecting phase drift in gyroscope demodulation.

Description of the Related Art

It is often beneficial to sense the motion of an electronic device for vehicle. For this reason, many vehicles and electronic devices include inertial sensors. Inertial sensors can include accelerometers and gyroscopes. Accelerometers can detect linear motion. Gyroscopes can detect rotational motion.

Detecting a rotation rate of a vehicle or electronic device with a gyroscope can be quite complicated. This is due, in part, to the fact that complex signals are utilized to excite a resonating mass of the gyroscope enough to sense the rotational motion of the resonating mass. It can be quite difficult to accurately extract the rotational rate from the raw output signal of the gyroscope.

One particularly complicating factor is the quadrature component of an output signal. The raw output of a gyroscope corresponds to oscillation of a resonating mass in a sense direction perpendicular to the excitation direction of the resonating mass. While rotational motion will cause oscillation of the resonating mass of the sense direction, the quadrature effect will also contribute to oscillation of the resonating mass of the sense direction. However, the quadrature component of the raw output signal is spurious and does not represent rotational motion.

Gyroscopes have leveraged the fact that the quadrature component of the raw output signal is typically in phase with the excitation or driving signal, while the rotational component of the raw output signal is typically 90° out of phase with the excitation or driving signal. Accordingly, the rotational component of the raw output signal the can be obtained by extracting the component of the raw output signal that is 90° out of phase with the excitation or driving signal. However, if there is phase drift associated with the raw output signal, then extracting the component of the output signal that is 90° out of phase with the driving signal will not accurately represent the rotational rate.

BRIEF SUMMARY

Embodiments of the present disclosure provide a sensor unit including a gyroscope. The sensor unit effectively and efficiently identifies phase drift between the raw output signal of the gyroscope and the drive signal of the gyroscope. This is accomplished by applying a test voltage to quadrature compensation electrodes adjacent to the resonator mass of the gyroscope and detecting changes in a demodulated output signal of the gyroscope while applying the test voltage. After the phase drift has been identified, the phase drift can be taken into account in generating the demodulated output signal. The demodulated signal will then accurately represent the rotational component of the raw output signal.

The demodulated signal is generated by demodulating the raw output signal with the drive signal. The demodulation process extracts the portion of the raw output signal that is 90 degrees out of phase with the drive signal. When a phase drift is detected while applying the test voltage, then a delay compensation circuit inserts a delay into the drive signal before demodulation occurs. The added delay compensates for the phase drift, effectively eliminating the negative effects of the phase drift.

The test signal includes a first phase and a second phase. In the first phase the test signal has a first polarity. In the second phase, the test signal has a second polarity. The sensor unit detects the difference in the demodulated output signal between the first phase and the second phase of the test signal. The difference is indicative of the phase drift.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and processes associated with gyroscopes and gyroscope signal process have not been shown or described in detail, to avoid unnecessarily obscuring descriptions of the embodiments. Further, well-known components and circuits associated with gyroscopic sensor units have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first,"

"second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
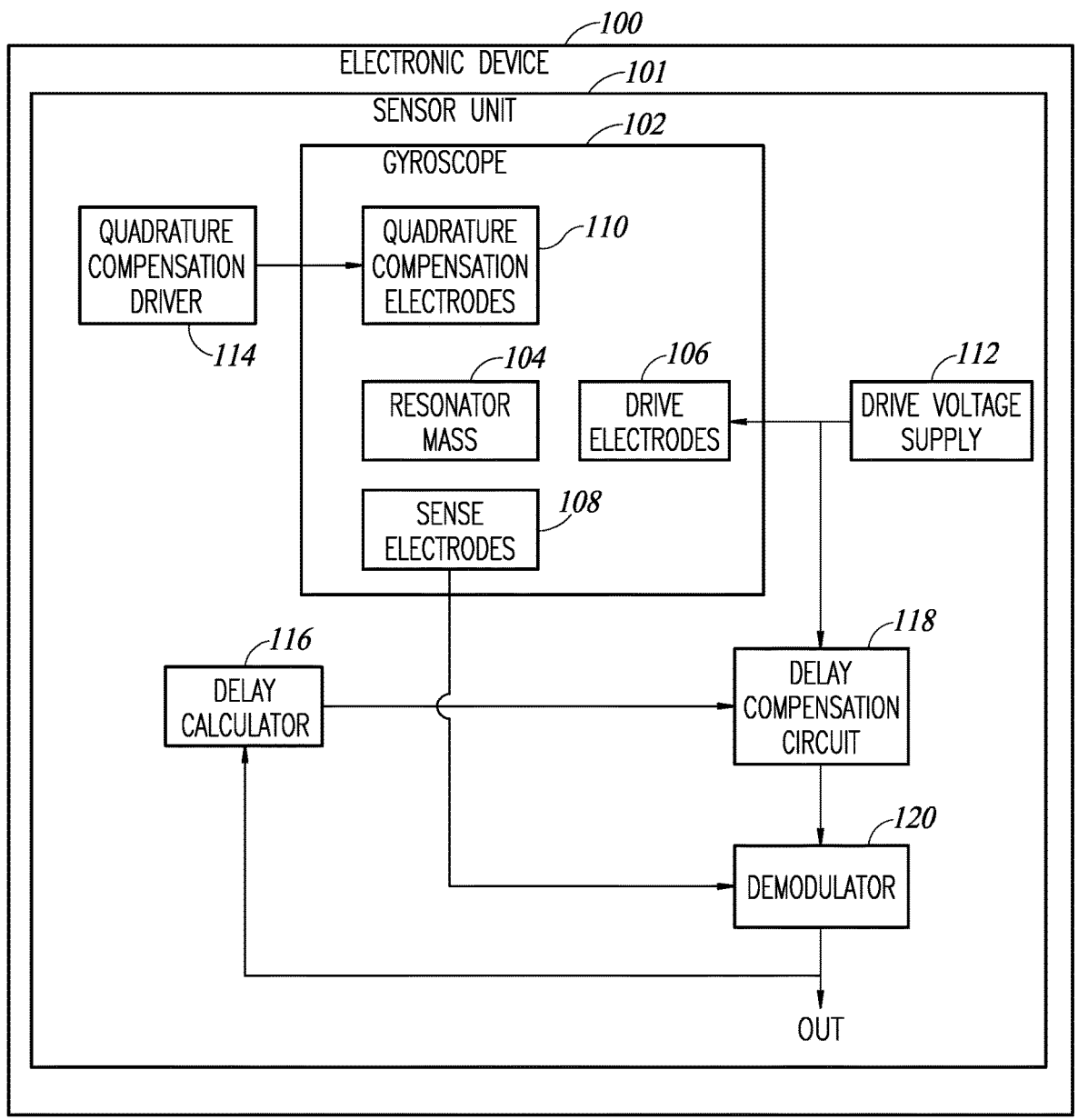
FIG. 1 is a block diagram of an electronic device including a sensor unit having a gyroscope, according to some embodiments.

FIG. 1 is a block diagram of an electronic device 100, according to some embodiments. The electronic device 100 includes a sensor unit 101. The sensor unit 101 includes a gyroscope 102. As will be set forth in more detail below, the sensor unit 101 identifies phase drift associated with an output signal of the gyroscope 102 and compensates for the phase drift in order to provide an accurate indication of a rotational rate applied to the electronic device 100.

The electronic device 100 can include a vehicle, such as an automobile, an aircraft, a boat, or other types of vehicles. It is often very beneficial to know the training rate of the vehicle about one or more axes of rotation. In vehicles, these axes of rotation may correspond to yaw, roll, and pitch. The gyroscope 102 may be utilized to detect the rotational rate of the vehicle about one or more of these axes.

The electronic device 100 can include a personal electronic device such as a smart phone, a smartwatch, smart glasses, a gaming device, a gaming controller, a tablet, a laptop computer, or other types of personal electronic devices. The gyroscope 102 may be utilized to detect the rotational rate of the electronic device 100 about one or more rotational axes. The electronic device 100 can include industrial equipment or other types of devices that may benefit from detecting rotational rates.

The gyroscope 102 may correspond to a microelectromechanical systems (MEMS) gyroscope. The mems gyroscope 102 can include one or more movable masses defined from and coupled to a silicon substrate by one or more spring door hinge members. The mems gyroscope may also include various electrodes interleaved with the movable mass. Embodiments described herein are directed primarily to electro-capacitive mems gyroscopes. Nevertheless, other types of gyroscopes can be used in accordance with principles of the present disclosure without departing from the scope of the present disclosure.

The gyroscope 102 includes a resonator mass 104, drive electrodes 106, and sense electrodes 108. As shown in FIG. 1, the resonator mass 104, the drive electrodes 106, and the sense electrodes 108 are shown as making up the gyroscope 102, while other components associated with generating signals, sensing signals, and processing signals are shown as external to the gyroscope 102. However, in practice, the gyroscope 102 may be considered as including the various other components of the sensor unit 101 that will be described in greater detail below and that are shown as being external to the gyroscope 102. The sensor unit 101 may, as a whole, be considered as a gyroscope.

The resonator mass 104 may include a mass suspended above or otherwise movably coupled to a substrate. The resonator mass 104 is configured to oscillate in at least two directions. A first direction of oscillation is known as a drive direction and corresponds to a first axis. A second direction of oscillation is known as a sense direction and corresponds to a second axis substantially perpendicular to the first axis. Oscillation of the resonator mass along the sense axis or sense direction is indicative of rotation of the resonator mass 104 about a third axis substantially perpendicular to the first axis and the second axis.

The resonator mass 104 may be coupled to a fixed substrate by spring members that allow the resonator mass to move back and forth along the drive axis. The resonator mass 104 may also be coupled to the fixed substrate by spring members that allow the resonator mass to move back and forth along the sense axis. While FIG. 1 shows the resonator mass 104 as a single mass, in practice, the resonator mass 104 may include multiple masses. For example, a first mass may be coupled to a second mass by spring members. The first mass may be driven to oscillate along the drive axis. Rotation of the electronic device 100 around the rotation axis (third axis) may cause the second mass to oscillate along the sense axis (second axis). Various configurations of a resonator mass 104 or multiple resonator masses 104 can be utilized without departing from the scope of the present disclosure.

The drive electrodes 106 are utilized to drive the resonator mass 104 in the second direction. The drive electrodes 106 may correspond to a conductive mass with a comb shape. The fingers of the comb-shape may be interleaved with corresponding comb fingers of the resonator mass 104. If a voltage is applied to the resonator mass 104, then applying a periodic voltage to the drive electrodes can drive oscillation of the resonator mass 104 along the drive axis. Various other configurations of drive electrodes 106 can be utilized without departing from the scope of the present disclosure.

The sense electrodes 108 are utilized to sense oscillation of the resonator mass 104 along the sense axis. The sense electrodes 108 may correspond to a conductive mass of the comb shape. The fingers of the comb shape may be interleaved with corresponding comb fingers of the resonator mass 104. Various other configurations of sense electrodes 108 can be utilized without departing from the scope of the present disclosure As described previously, if the electronic device 100 and, correspondingly, the resonator mass 104, is rotated around the third rotation axis while the resonator mass 104 is oscillating along the first axis, then the resonator mass 104 will be forced to oscillate along the second axis by the Coriolis force that results from the rotation around the rotation axis and the oscillation along the first axis. Accordingly, the oscillation of the resonator mass 104 along the sense axis is indicative of the rotation of the resonator mass 104 around the rotation axis.

The sensor unit 101 includes a drive voltage supply 112. The drive voltage supply 112 applies a drive voltage to the drive electrodes 106. The drive voltage may correspond to an AC voltage having a selected amplitude and frequency. The drive voltage may be a sinusoidal voltage, a square wave voltage, a sawtooth voltage, or other types of AC voltage waveforms.

In the example of a constant rate gyroscope, the oscillation along the sense axis resulting from the Coriolis force will have the same frequency as the oscillation of the drive signal. However, the amplitude of the oscillation along the sense direction is indicative of the magnitude of the rotational rate around the third axis. The amplitude of the oscillation is indicated by the voltage that develops at the sense electrodes 108 by capacitive interaction with the resonator mass 104. However, as set forth previously, other sensing configurations can be utilized without departing from the scope of the present disclosure.

The signal output by the sense electrodes 108 corresponds to the raw output signal of the gyroscope 102. However, the raw output signal of the gyroscope 102 may not, by itself, accurately indicate the rotational rate around the third axis. This is because of a quadrature effect that develops at the resonator mass 104. In particular, when the resonator mass 104 is driven to oscillate along the first axis by the drive voltage applied to the drive electrodes 106, the resonator mass 104 may also begin to oscillate along the sense axis even if there is no rotation around the rotational axis. Accordingly, the oscillation due to the quadrature affect may be considered a spurious oscillation, or the component of the raw output signal that is based on the quadrature affect may be considered a spurious signal. The raw output signal may be a current or may be a voltage, depending on a selected configuration of the gyroscope 102.

In some cases the component of the raw output signal due to the quadrature affect may be much larger than the component of the raw output signal due to the rotation of the electronic device 100 around the rotational axis. In fact, the component of the raw output signal from the quadrature affect may be many times larger than the component of the raw output signal from the Coriolis force.

The sensor unit 101 utilizes the demodulator 120 in order to extract the Coriolis component from the raw output signal. As the raw output signal is made up of the quadrature component and the Coriolis component, if the Coriolis component can be extracted from the raw output signal, then a final output signal can be generated that corresponds only to the Coriolis component of the raw output signal. The demodulator 120 extracts the Coriolis component from the raw output signal and generates a final output signal that indicates the rotational rate around the rotation axis. As used herein, the terms "Coriolis component" and "rotational component" may be used interchangeably.

The demodulator 120 utilizes the fact that the Coriolis component of the raw output signal will be 90° out of phase with the quadrature component of the raw output signal in order to separate the Coriolis component from the quadrature component. Furthermore, absent any collective phase drift in the raw output signal, the quadrature component will be in phase with the drive signal while the Coriolis component is 90° out of phase with the drive signal. Accordingly, the demodulator 120 receives the drive signal and the raw output signal and performs demodulation of the raw output signal based on the drive signal. In particular, the demodulator 120 outputs only that portion of the raw output signal that is 90° out of phase with the drive signal. If there is no phase drift between the raw output signal and the drive signal, then the output of the demodulator 120 will represent only the Coriolis portion of the raw output signal.

Nevertheless, in some cases, there is a phase drift between the drive signal and the raw output signal. More particularly, the phase drift may occur between the raw output signal and a demodulation signal that is based on the drive signal. The demodulation signal may have a same phase as the drive signal, or may initially have a same phase as the drive signal. The phase drift corresponds to an angle $\varphi$ by which the quadrature component is out of phase with the demodulation signal. The Coriolis component will be out of phase by 90°±the value of $\varphi$, depending on the direction of the phase drift. Even a very small phase drift can result in the demodulator 120 generating a final output signal that is very inaccurate. Phase drift can result from variations in temperature, mechanical stress, or variations during processing of the sensor unit 101. The demodulation signal is a drive reference signal. As used herein, "demodulation signal" and "drive reference signal" may be used interchangeably.

The sensor unit 101 utilizes quadrature compensation electrodes 110, a quadrature compensation driver 114, a delay calculator 116, and a delay compensation circuit 118 in order to identify and compensate for phase drift. In one example, the quadrature compensation electrodes 110 are positioned adjacent to the resonator mass 104. The quadrature compensation electrodes 110 can be used in both cases of in-plane sense axis (yaw) or out of plane sense axis (pitch and roll) bases on selected design characteristics. The quadrature compensation electrodes 110 can be utilized to drive motion of the resonator mass 104 along the sense axis in order to compensate for or cancel out the natural quadrature that develops from driving the resonator mass 104 along the drive axis. Nevertheless, principles of the present disclosure provide a potentially more effective way to utilize the quadrature compensation electrodes 110 in order to identify and compensate for phase drift in the raw output signal.

The quadrature compensation driver 114 is configured to apply a test signal to the quadrature compensation electrodes 110. The quadrature compensation driver 114 applies a test signal during a testing period the delay calculator 116 measures changes in the output of the demodulator 120 during the testing period. The delay calculator 116 calculates the value of phase drift between the raw output signal and the demodulation signal based on changes in the output of the demodulator 120 during the testing period.

In some embodiments, the testing period has two phases. During the first phase, the test signal has a first polarity. During the second phase, the test signal switches to a second polarity opposite the first polarity. The change in the output of the output of the demodulator 120 between the two phases of the test period is indicative of the magnitude of the phase drift $\varphi$. The delay calculator 116 calculates the value of the phase drift $\varphi$ based, in part, on the change in the output of the demodulator 120 between the two phases of the test. Further details regarding the calculation of the phase drift $\varphi$ are provided below.

The delay calculator 116 passes the phase delay value $\varphi$ to the delay compensation circuit 118. The delay compensation circuit 118 also receives the demodulation signal that is based on the drive signal. The delay compensation circuit 118 delays the demodulation signal by the value of the phase delay $\varphi$. The delay compensation circuit 118 passes the delay drive signal to the demodulator 120. While FIG. 1 illustrates the same signal being passed from the drive voltage supply to the delay compensation circuit and the drive electrodes, in practice, the drive voltage supply may supply the drive signal to the drive electrodes 106 and may supply the demodulation signal that is based on the drive signal to the delay compensation circuit.

Because the demodulation signal is now delayed by the same value $\varphi$ as is the raw output signal, the Coriolis component of the raw output signal is 90° out of phase with the delayed demodulation signal. When the demodulator 120 performs demodulation on the delayed demodulation signal and the raw output signal, the demodulator 120 outputs the true Coriolis component of the raw output signal. Accordingly, the demodulator 120 outputs a signal that accurately indicates the rotational rate of the electronic device 100 around the rotational axis.

Figure 2A:
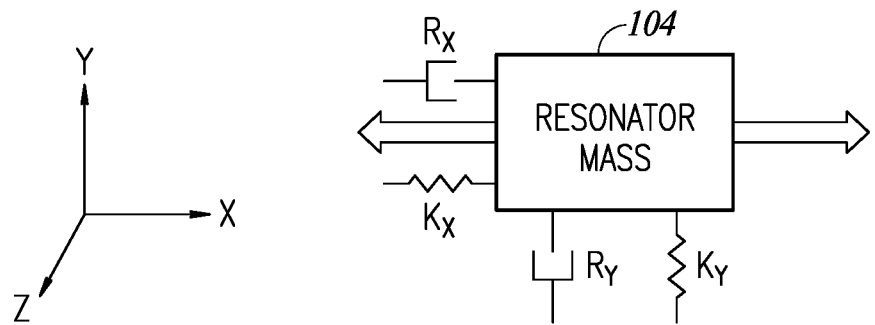
FIGS. 2A and 2B are simplified illustrations of a resonator mass of a gyroscope, according to some embodiments.

FIG. 2A is a simplified representation of the resonator mass 104 of the gyroscope 102, in accordance with some embodiments. The resonator mass is able to oscillate in the X direction by a spring represented here by the spring Kx. Oscillation of the resonator mass 104 in the X direction is dampened by a resistance Rx. The resonator mass 104 is able to oscillate in the Y direction by a spring represented here by the spring Ky. Oscillation of the resonator mass 104 in the Y direction is dampened by a resistance Ry. In practice, the resonator mass 104 may include masses coupled together in various configurations.

The X-axis corresponds to the drive axis of the resonator mass 104. The y-axis corresponds to the sense axis of the resonator mass 104. The z-axis corresponds to the rotational axis. Accordingly, motion of the resonator mass 104 along the sense axis Y is indicative of the rotational rate of the resonator mass about the rotational axis Z.

In FIG. 2A, the drive electrodes (see FIG. 1) drive the resonator mass 104 to oscillate in the X direction. In FIG. 2A, there is no oscillation along the y-axis in FIG. 2A. Accordingly, there is no rotational rate around the rotational axis Z and there is no quadrature motion along the y-axis. Unfortunately, in practice there is typically a quadrature component along the sense axis anytime there is motion along the drive axis.

Figure 2B:
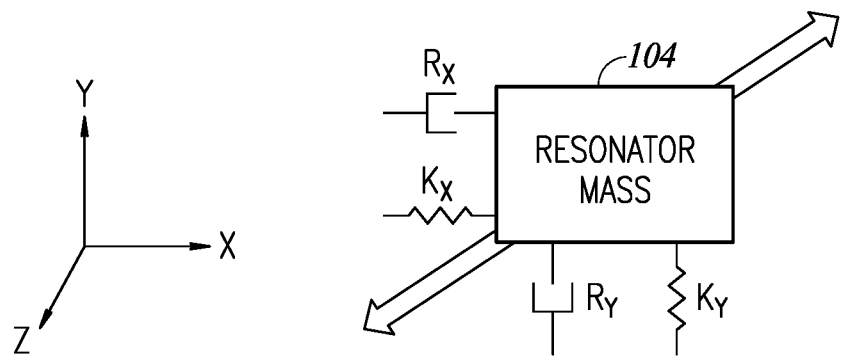

FIG. 2B illustrates both motion along the drive axis and motion along the sense axis. This is indicated by the diagonal arrows that have components in both the X and Y direction. In the example FIG. 2B, there is no rotational motion around the z-axis. Accordingly, all of the motion on the y-axis is quadrature motion. FIGS. 2A and 2B are provided to illustrate basic concepts of drive motion and quadrature motion.

Figure 3:
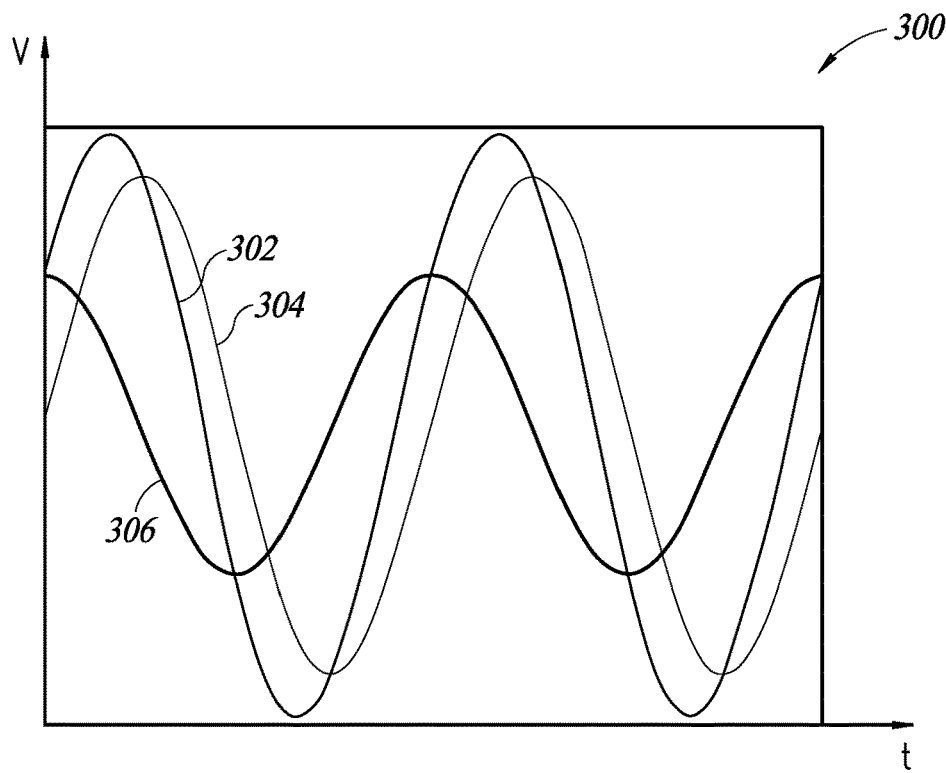
FIG. 3 is a graph illustrating signals associated with a gyroscope, according to some embodiments.

FIG. 3 is a graph 300 illustrating various signals output by the gyroscope 102, in accordance with some embodiments. The graph 300 includes the raw output signal 302 of a gyroscope 102. The raw output signal 302 is sinusoidal in nature based on the capacitive output signals generated by sinusoidal motion of the resonator mass 104 relative to sense electrodes 108.

FIG. 3 also illustrates the quadrature component 304 of the raw output signal 302. If there is no phase drift between the demodulation signal and the raw output signal, the quadrature component 304 of the raw output signal 302 will be in phase with the demodulation signal.

FIG. 3 also illustrates the Coriolis component 306 of the raw output signal 302 of the gyroscope 102. The Coriolis component 306 is that portion of the raw output signal that is generated by the Coriolis force from rotation of the electronic device 100 about the rotational axis while the resonator mass 104 is driven to oscillate along the drive axis. If there is no phase drift, the Coriolis component 306 will be 90° out of phase with the demodulation signal.

The raw output signal 302 is the sum of the quadrature component 304 and the Coriolis component 306. In practice, the amplitude of the quadrature component 304 may be many times larger than the amplitude of the Coriolis component 306. Accordingly, it is highly beneficial to effectively demodulator the Coriolis component from the quadrature component using the demodulation signal as a phase reference.

Figure 4:
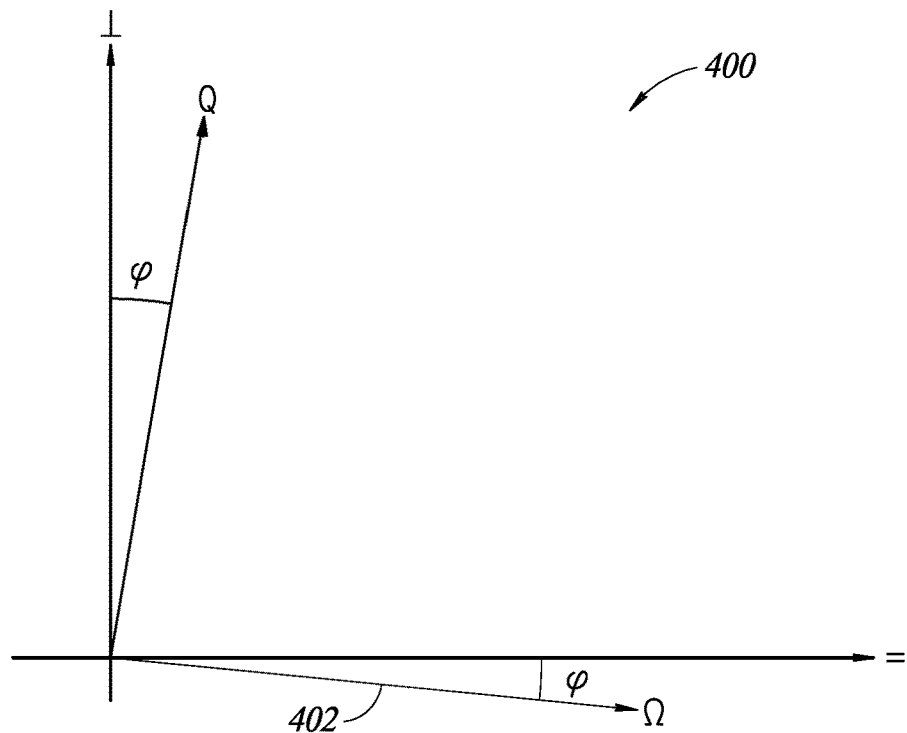
FIG. 4 is a graph representing a demodulation plane associated with drive and output signals of a gyroscope, according to some embodiments.

FIG. 4 is a graph of the demodulation plane 400 associated with the raw output signal and the demodulation signal or drive signal of a gyroscope 102, in accordance with some embodiments. The demodulation plane 400 has two axes. The first axis is the parallel axis extending in the horizontal direction in FIG. 4 and annotated with the parallel symbol "=". The second axis is the perpendicular axis extending in the vertical direction in FIG. 4 and annotated with the perpendicular symbol "⊥". In the demodulation plane 400, the parallel (horizontal) axis is the component of the raw output signal that is in phase with the demodulation signal. The perpendicular (vertical) axis is 90° out of phase with the demodulation signal.

FIG. 4 illustrates the quadrature component Q and the rotational component Ω of the raw output signal from the gyroscope 102. The quadrature component Q and the raw output signal Ω are 90° out of phase with each other. As described previously, if there is no phase drift then the quadrature component Q will align with the perpendicular axis. If there is no phase drift, then the rotational component Ω will align with the parallel axis. The demodulator 120 of the sensor unit 101 outputs the parallel (horizontal) component of the raw output signal as the final output signal of the sensor unit 101. Accordingly, if there is no phase drift then the output of the demodulator will correspond entirely to the rotational component of the raw output signal.

In FIG. 4, there is a phase drift cp. As can be seen in FIG. 4, the quadrature component Q is offset from the perpendicular axis by the phase drift angle φ. The rotational component Ω is offset from the parallel axis by the phase drift angle φ. In this situation, when the demodulator 120 outputs the parallel component, the parallel component will not accurately represent the rotational component Ω. While FIG. 4 illustrates the quadrature component Q and the rotational component Ω as being substantially equal in magnitude, in practice, the magnitude of the quadrature component Q may be many times greater than the magnitude of rotational component Ω. Accordingly, even a small phase drift angle φ will result in a very inaccurate representation of the rotational or Coriolis component Ω of the raw output signal. As used herein, the terms "phase drift" and "phase delay" may be used interchangeably.

Figure 5A:
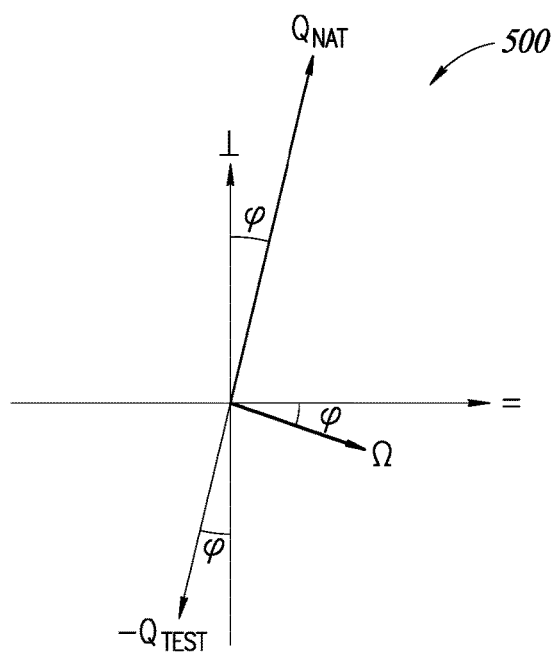
FIGS. 5A and 5B are graphs illustrating a demodulation plane associated with drive and output signals of the gyroscope during a test period of the gyroscope, according to some embodiments.
Figure 5B:
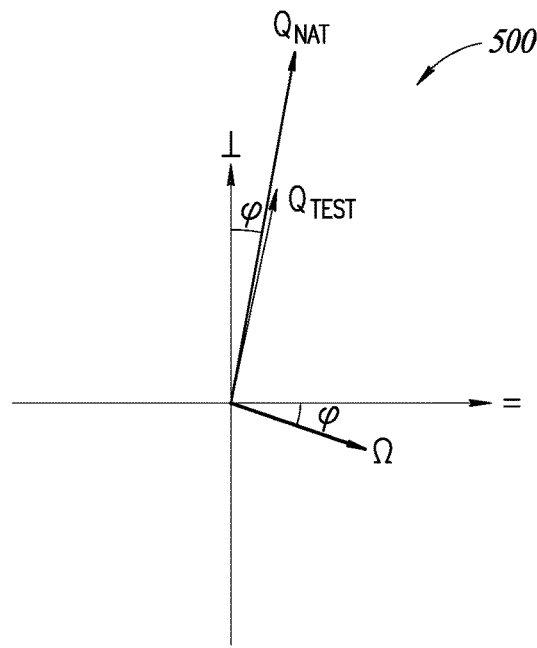

FIGS. 5A and 5B are representations of the demodulation plane 500 associated with a raw output signal during application of a test signal, in accordance with some embodiments. The description of FIGS. 5A and 5B will begin with reference to FIG. 1. FIG. 5A illustrates the demodulation plane during a first phase of a testing period in which the test signal is applied to quadrature compensation electrodes 110. FIG. 5B illustrates the demodulation plane during a second phase of the testing period in which the test signal is applied to the quadrature compensation electrodes 110.

During the first phase of the testing period, the quadrature compensation driver 114 applies a test voltage −Vt, increasing the voltage difference with respect to the rotor mass. During application of the first phase of the test voltage the quadrature component of the raw output signal will have a natural quadrature component Qnat and a negative quadrature test component −Qtest. In practice, this results in a total quadrature component that is less than the natural quadrature component Qnat. FIG. 5A also illustrates the rotational component Ω of the raw output signal of the gyroscope 102. In FIG. 5A there is a phase drift angle φ for each of the components of the raw output signal. The output $I_{PH1}$ of the demodulator 120 in phase 1 of the testing period is the sum of the parallel or horizontal components of the natural quadrature component Qnat, the negative test quadrature component Qtest, and the Coriolis component.

During the second phase of the testing period, the quadrature compensation driver 114 applies a test voltage Vt., reducing the voltage difference with respect to the rotor mass. During application of the second phase of the test voltage, the quadrature component of the raw output signal will have the natural quadrature Qnat component and a positive quadrature test component. In practice, this results in a total quadrature component that is greater than the natural quadrature component Qnat. The output $I_{PH2}$ of the demodulator 120 and the second phase of the testing period is the parallel or horizontal components of the natural quadrature component Qnat, the positive test quadrature component Qtest, and the Coriolis component.

The delay calculator 116 receives the output of the demodulator 120 during the first and second phases of the testing period and calculates the phase drift angle φ. The delay calculator 116 calculates the angle φ based on the change in the output of the demodulator 120 between the first and second phases of the testing period and based on the magnitude of the quadrature test component. $I_{PH2}$ is given by the following relationship:

$$I_{PH2} = Q_{nat} \cdot \sin(\varphi) + Q_{test} \cdot \sin(\varphi) + \Omega \cdot \cos(\varphi).$$

$I_{PH1}$ is given by the following relationship:

$$I_{PH1} = Q_{nat} \sin(\varphi) - Q_{test} \cdot \sin(\varphi) + \Omega \cdot \cos(\varphi).$$

The difference in the output of the demodulator between the first and second phases is given by the following relationship:

$$I_{PH2} - I_{PH1} = 2 Q_{test} \cdot \sin(\varphi).$$

Solving for sin(φ) gives the following:

$$\sin(\varphi) = (I_{PH2} - I_{PH1})/(2 Q_{test}).$$

Because the phase drift angle φ is very small (φ<<1°), the small angle relationship can be used:

$$\sin(\varphi) = \varphi.$$

Incorporating the small angle approximation into the equation above yields the following relationship for the phase drift angle φ:

$$\varphi = (I_{PH2} - I_{PH1})/(2 Q_{test}).$$

As set forth above, the phase drift angle φ can be calculated based on the difference in the output of the demodulator 120 between the first and second phases of the testing period and on the magnitude of the test component of the quadrature component. The phase drift angle φ can change based on temperature, process, mechanical stress, and other factors. However, the delay calculator 116, in connection with the quadrature compensation driver 114, can quickly and accurately determine the phase drift angle φ at any time with little or no interruption to the operation of the gyroscope 102.

Furthermore, a relatively small number of compensation electrodes 110 can be utilized to identify the phase drift angle φ. In the scheme in which compensation electrodes are utilized to largely eliminate the quadrature component of the raw sensor signal, a very large number of compensation electrodes may be utilized. However, a comparatively small number compensation electrodes 110 can be utilized to identify the phase drift angle φ. This can save an enormous amount of area in manufacturing the gyroscope 104.

In another example, a more accurate estimation of the amplitude of Qtest can be obtained by using the information on the perpendicular axis. While Qtest may normally be quite stable, such an estimation may be beneficial in case of reduction of second order effects. During the first phase of the testing period, the total signal $Q_{PH1}$ on the perpendicular axis is given by the following formula:

$$Q_{PH1} = -Q_{test} \cdot \cos(\ ) + \Omega \cdot \sin(\varphi) + Q_{nat} \cdot \cos(\varphi).$$

During the second phase of the testing period, the total signal $Q_{PH2}$ on the perpendicular axis is given by the following formula:

$$Q_{PH2} = Q_{test} \cdot \cos(\varphi) + \Omega \cdot \sin(\varphi) + Q_{nat} \cdot \cos(\varphi).$$

Subtracting $Q_{PH1}$ from $Q_{PH2}$ gives:

$$Q_{PH2} - Q_{PH1} = 2 Q_{test} \cdot \cos(\varphi).$$

Because φ is typically a very small angle, Qtest can be approximated in the following manner:

$$Q_{test} \cdot \cos(\varphi) \approx Q_{test}.$$

Qtest can then be estimated in the following manner:

$$Q_{test} = (Q_{PH2} - Q_{PH2})/2.$$

Figure 6:
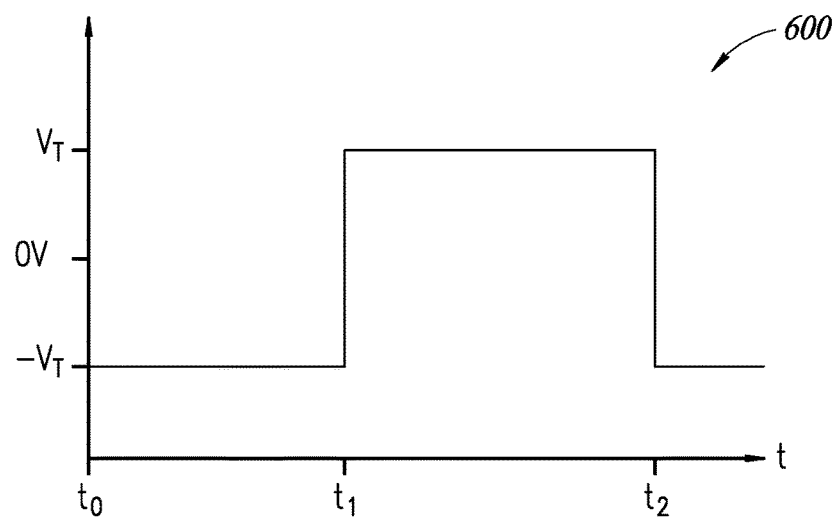
FIG. 6 is a graph illustrating a test signal of the gyroscope, according to some embodiments.

FIG. 6 is a graph illustrating a test signal 600 applied by the quadrature compensation driver 114 to the quadrature compensation electrodes 110. At time T0 the first phase of the testing period begins by applying the test voltage with a negative polarity −Vt to the compensation electrodes 110. At time T1 the second phase of the testing period begins by switching a polarity of the test signal 600 to a positive polarity Vt. during the first phase, a negative quadrature test voltage −Qtest is inserted into the raw output signal of the gyroscope 102. During the second phase a positive quadrature test component Qtest is inserted into the raw output signal the gyroscope 102. As set forth above, the delay calculator 116 is able to measure the difference in the output of the demodulator between the first and second phases of the testing and calculate the phase drift angle by dividing the difference by 2*Qtest.

Figure 7:
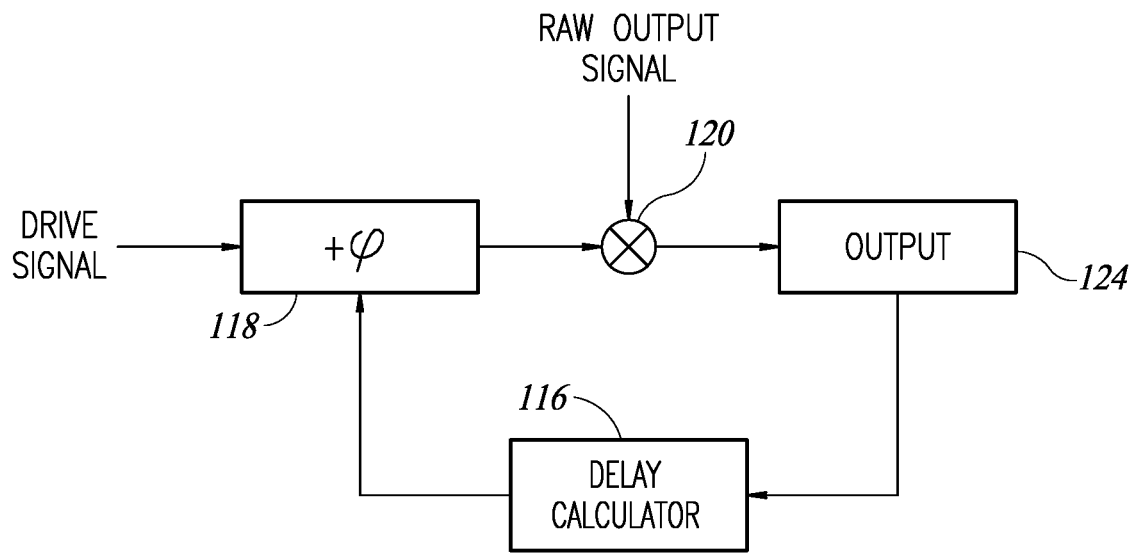
FIG. 7 is a block diagram illustrating aspects of an output operation of a sensor unit, according to some embodiments.

FIG. 7 is a block diagram of a portion of a sensor unit 101, in accordance with some embodiments. The sensor unit 101 includes a demodulator 120. The demodulator 120 receives a raw output signal from a gyroscope 102. The demodulator 120 also receives a demodulation signal from a delay compensation circuit 118. The demodulation signal can correspond to the drive signal. The demodulator 120 provides a demodulated signal to an output block 124. The output block may perform some signal processing on the demodulated signal. The output block provides the demodulated signal to the delay calculator 116. The delay calculator 116 calculates the phase drift angle φ in the manner described above. The delay calculator 116 provides the phase drift angle value φ to the delay compensation circuit 118. The delay compensation circuit 118 receives the demodulation signal, adds in a phase delay equal to the phase drift angle value φ, and provides the delayed demodulation signal to the demodulator 120. The output of the demodulator 120 now corresponds to the Coriolis component of the raw output signal.

Figure 8:
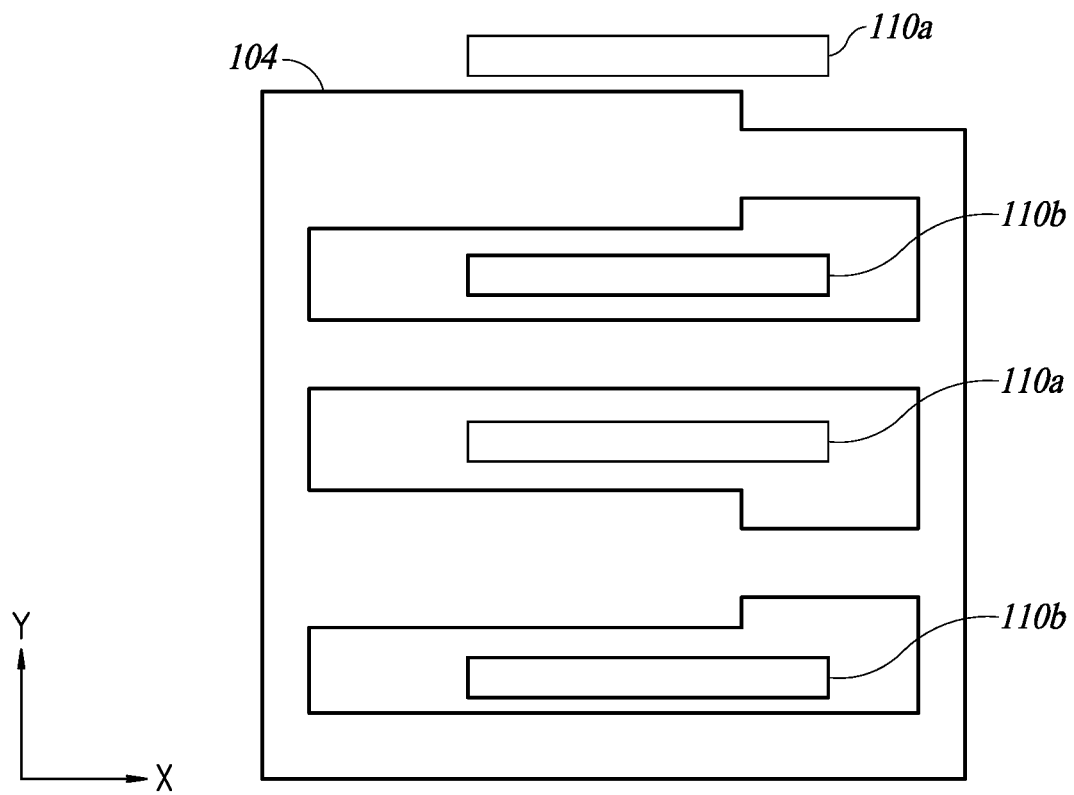
FIG. 8 is an illustration of a portion of a gyroscope, according to some embodiments.

FIG. 8 is an illustration of a portion of a resonator mass 104 of the gyroscope 102, in accordance with some embodiments. FIG. 8 also illustrates compensation electrodes 110a and 110b positioned in gaps in the resonator mass 104. The compensation electrodes 110a and 110b are fixed in place. The resonator mass 104 is movable.

In the example of FIG. 8 the resonator mass 104 is driven to oscillate along the X axis by drive electrodes 106 (not shown) adjacent to another portion of the resonator mass 104 not shown in FIG. 8. The resonator mass 104 has thick portions that are closer to the compensation electrodes 110a and 110b and thinner portions that are further away from the quadrature compensation electrodes 110a and 110b. As the resonator mass 104 moves back and forth along the X axis, the portions of the resonator mass 104 the amount of area of the thick portions also that is directly between two quadrature compensation electrodes 110 and 110b also changes. As the resonator mass moves to the left along the X axis, the amount of area of the thick portions facing quadrature compensation electrodes 110a and 110b decreases. As the resonator mass moves to the right along the X axis, the amount of area of the thick portions facing quadrature compensation electrodes 110a and 110b increases.

By applying a voltage to the resonator mass 104, and then applying a voltage between each pair of electrodes 110a and 110b, a quadrature compensation force is generated. In one example, the resonator mass 104 receives a voltage of 10 V. During the first phase of the test, the electrodes 110a receive 4 V and the electrodes 110b receives 6 V. Because there is a higher voltage difference between the mass and the electrodes 110a then between the mass 104 and the electrodes 110b, a net electrostatic force is applied to the mass 104 in the positive Y direction. During the second phase of the test period, the polarity between the electrodes 110a and 110b is switched so that the electrodes 110a receives 6 V and the electrodes 110b receive 4 V. The result is that a net electrostatic force is applied to the mass 104 in the negative Y direction. It should be noted that because the quadrature test force depends on the horizontal position of the resonator mass 104, the quadrature test force is in phase with the drive signal. Other voltage schemes can be applied to generate a quadrature test force without departing from the scope of the present disclosure.

Figure 9:
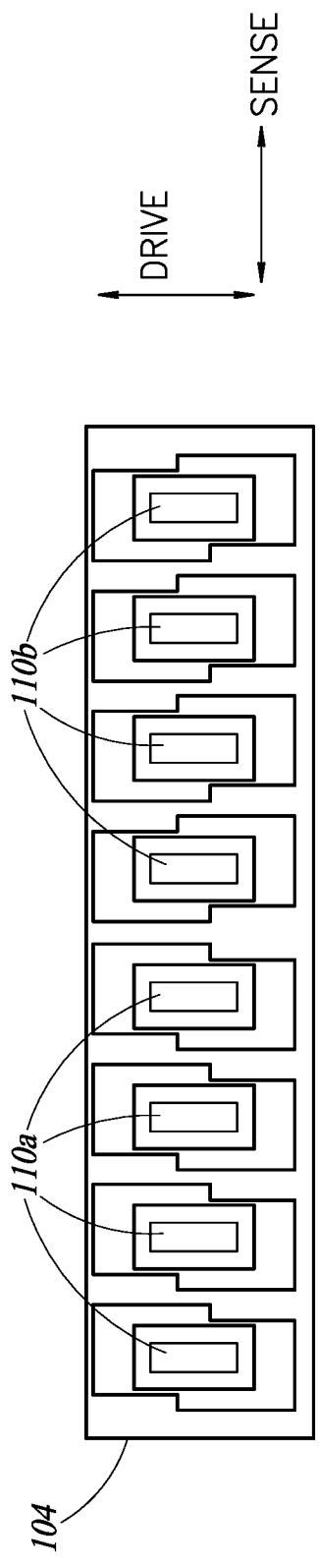
FIG. 9 is an illustration of a portion of a gyroscope, according to some embodiments.

FIG. 9 is a top view of a portion of a resonator mass 104 of a gyroscope 102, in accordance with some embodiments. FIG. 9 also illustrates compensation electrodes 110a and 110b positioned in gaps in the resonator mass 104. The compensation electrodes 110a and 110b are fixed in place. The resonator mass 104 is movable. FIG. 9 is an example of in-plane quadrature compensation electrodes 110a and 110b.

In the example of FIG. 9 the resonator mass 104 is driven to oscillate along the drive axis by drive electrodes 106 (not shown) adjacent to another portion of the resonator mass 104 not shown in FIG. 9. By applying a voltage to the resonator mass 104, and then applying a voltage between the sets of electrodes 110a and 110b, a quadrature compensation force is generated. In one example, the resonator mass 104 receives a voltage of 10 V. During the first phase of the test, the electrodes 110a receive 4 V and the electrodes 110b receives 6 V. During the second phase of the test period, the polarity between the electrodes 110a and 110b is switched so that the electrodes 110a receives 6 V and the electrodes 110b receive 4 V. Due to the geometry of the resonator mass relative to the test electrodes, a net electrostatic force is generated in different directions during the two test phases. Other voltage schemes can be applied to generate a quadrature test force without departing from the scope of the present disclosure.

Figure 10:
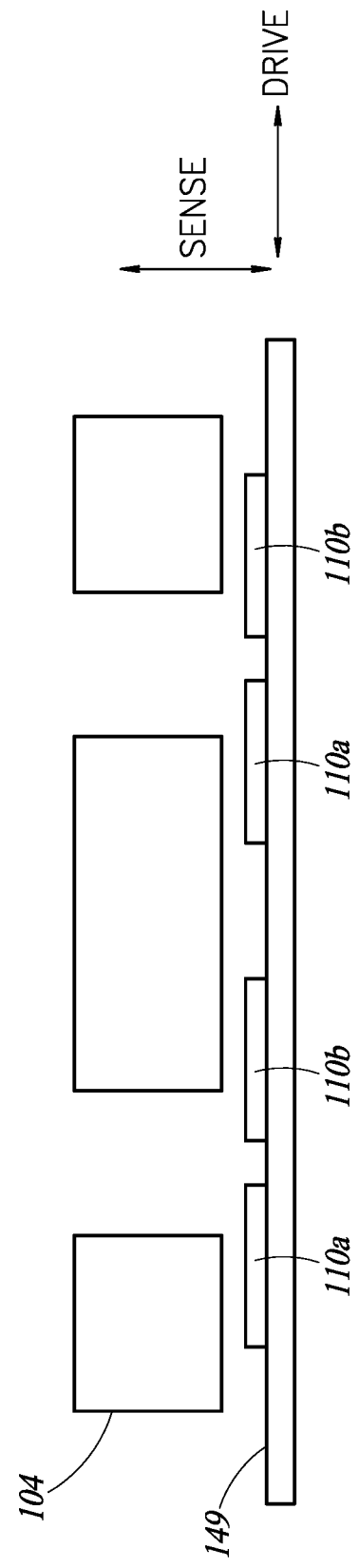
FIG. 10 is an illustration of a portion of a gyroscope, according to some embodiments.

FIG. 10 is a cross-sectional view a portion of a gyroscope 102, in accordance with some embodiments. FIG. 10 also illustrates compensation electrodes 110a and 110b positioned below the resonator mass on a substrate 149. The compensation electrodes 110a and 110b are fixed in place. The resonator mass 104 is movable. FIG. 10 is an example of out-of-plane quadrature compensation electrodes 110a and 110b.

In the example of FIG. 10 the resonator mass 104 is driven to oscillate along the drive axis by drive electrodes 106 (not shown) adjacent to another portion of the resonator mass 104 not shown in FIG. 10. By applying a voltage to the resonator mass 104, and then applying a voltage between the sets of electrodes 110a and 110b, a quadrature compensation force is generated. In one example, the resonator mass 104 receives a voltage of 10 V. During the first phase of the test, the electrodes 110a receive 4 V and the electrodes 110b receives 6 V. During the second phase of the test period, the polarity between the electrodes 110a and 110b is switched so that the electrodes 110a receives 6 V and the electrodes 110b receive 4 V. Due to the placement of the test electrodes 110a and 110b relative to the shape of the resonator mass 104, a net electrostatic force is generated in different directions during the two test phases. Other voltage schemes can be applied to generate a quadrature test force without departing from the scope of the present disclosure.

Figure 11:
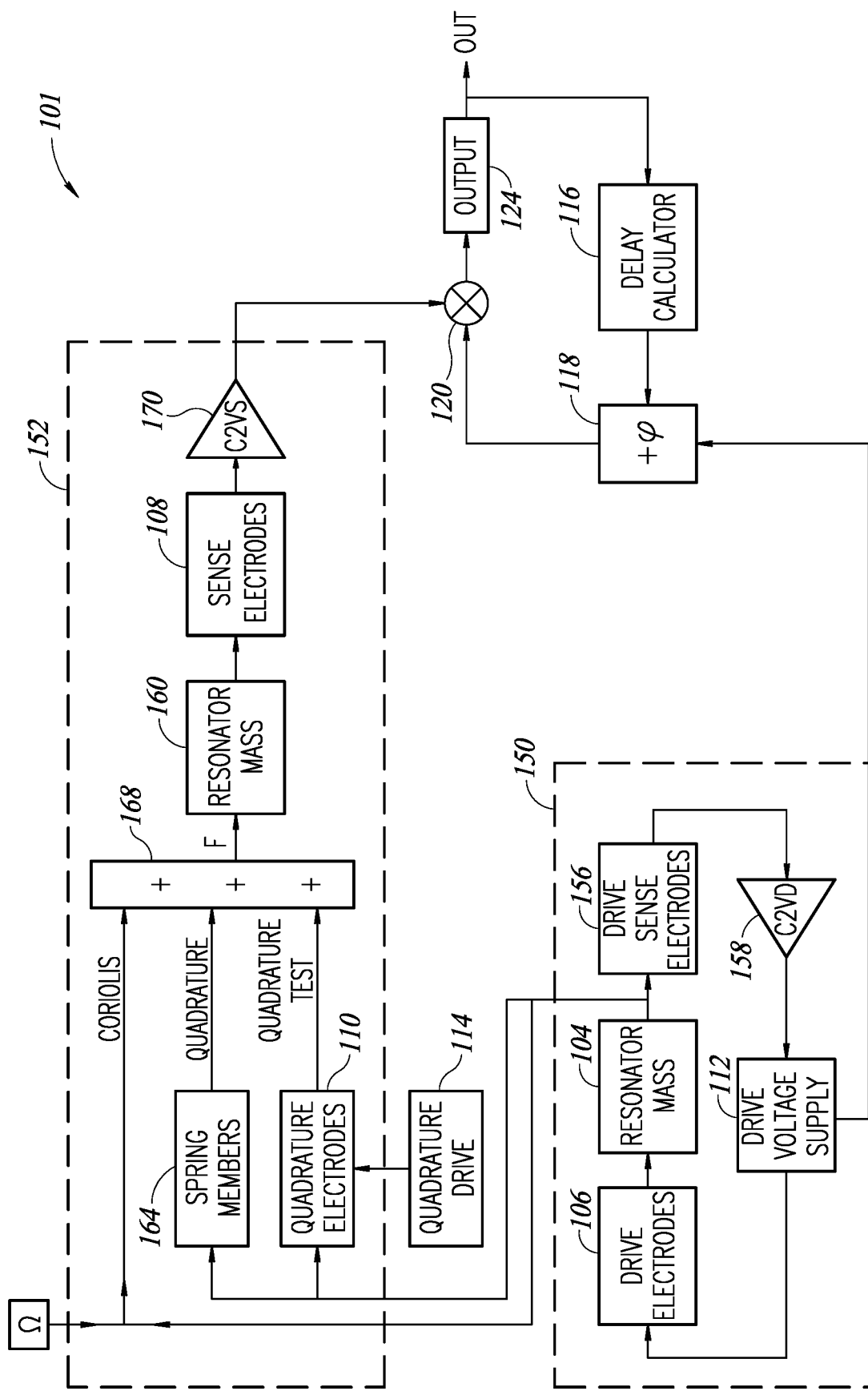
FIG. 11 is a block diagram illustrating a sensor unit including a gyroscope, according to some embodiments.

FIG. 11 is a schematic diagram of a sensor unit 101, in accordance with some embodiments. The sensor unit 101 includes a driving MEMS/ASIC 150 and a sense MEMS/ASIC 152. The MEMS/ASIC 150 includes a drive voltage supply 112. The drive voltage supply 112 applies a drive signal to drive electrodes 106. The drive voltage supply 112 may include a phase locked loop for controlling the phase of the drive signal. The drive voltage supply 112 may also include an adaptive gain control of controls the amplitude of the drive signal. The drive supply voltage also supplies a demodulation signal to a delay compensation circuit 118. The demodulation signal is a signal with a same phase as the drive signal, unless drift has occurred.

The drive electrodes 106 receive the drive signal from the drive voltage supply 112 and apply an electrostatic drive force to the resonator mass 104. The electrostatic drive force drives the resonator mass 104 to oscillate along the drive axis. The resonator mass 104 oscillates in accordance with a mechanical transfer function.

The drive MEMS/ASIC 150 includes drive sense electrodes 156 that convert the motion of the resonator mass 104 into a capacitive signal. The capacitive signal is passed to a converter that converts the capacitive signal to a voltage signal. The voltage signal is fed back into the drive voltage supply 112 in a feedback loop configuration so that the phase locked loop and adaptive gain control loop can control the phase and amplitude of the drive signal.

The displacement in the drive direction affects the sense MEMS/ASIC 152. The drive displacement and the rotational rate Ω interact to generate the Coriolis force based on the drive displacement velocity of the resonator mass 104 and the rotational rate Ω around the rotation axis. The displacement of the resonator mass 104 also interacts via spring couplings Kxy 164 to generate a quadrature force in the sense direction. The displacement of the resonator mass 104 also interacts with the quadrature compensation electrodes 110 in generating the quadrature compensation force. The quadrature compensation driver 114 applies the quadrature test signal to the quadrature compensation electrodes 110.

The conceptual block 168 represents the summation of all of the forces acting in the sense direction on the sense resonator mass 160. The Coriolis force, the quadrature force, and the quadrature compensation force all affect the motion of the sense resonator mass 160 along the sense axis. The sense resonator mass is coupled to the resonator mass 104 by springs. Though shown as separate masses in FIG. 11, in some cases, the sense resonator mass 160 and the resonator mass 140 are a single mass, or may effectively act as a single spring coupled mass.

Sense electrodes 108 sense the motion of the of the sense resonator mass 160 along the sense axis. The sense electrodes 108 generate a capacitive signal indicative of the motion of the sense resonator mass 160 along the sense axis. The capacitive signal is converted at block 170 to a sense voltage signal corresponding to the raw output signal of the gyroscope 102. The raw output signals provided to the demodulator 120.

The drive voltage supply 112 supplies a demodulated signal to the delay compensation block 118. The demodulated signal corresponds to a drive reference signal. Initially, the delay compensation block 118 may not add any delay into the demodulation signal. The delay compensation block 118 merely passes the demodulation signal to the demodulator 120. During the testing phase, and the quadrature compensation driver 114 applies a test signal to the quadrature compensation electrodes, switching polarities between first and second phases as described previously. The demodulator 120 demodulates the demodulation signal and the raw output signal and generates a demodulated signal. An output block 126 may perform some additional processing on the demodulated signal. The output block 126 provides the demodulated signal to the delay calculator 116. The delay calculator 116 calculates the phase drifting φ as described previously and provides the phase drift angle value to the delay compensation circuit 118. The delay compensation circuit delays the demodulation signal by the value of φ. The demodulator 120 then outputs a demodulated signal that accurately corresponds to the rotational rate Ω.

Figure 12:
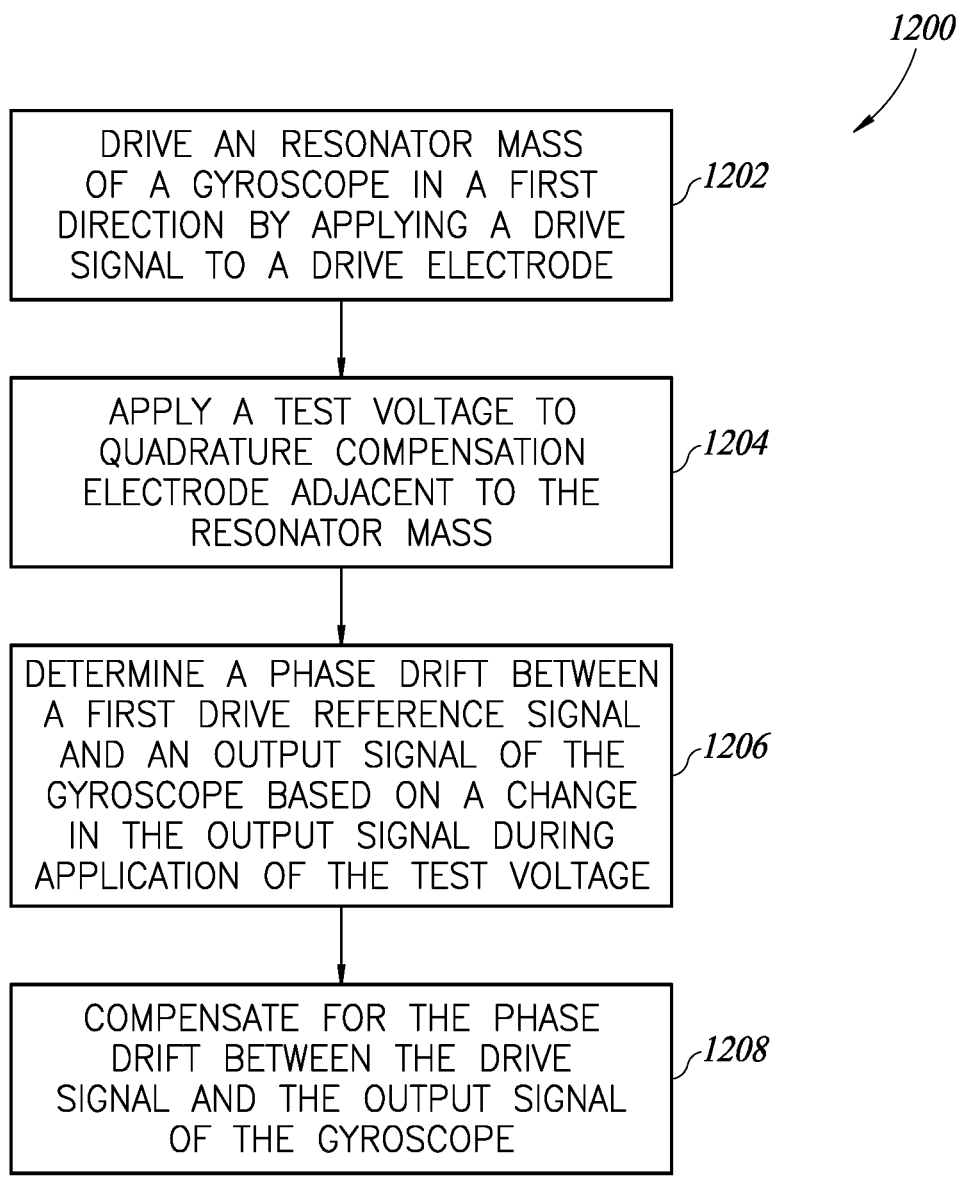
FIG. 12 is a flow diagram of a method for operating a gyroscope, according to some embodiments.

FIG. 12 is a flow diagram of a method 1200 for operating a gyroscope, in accordance with some embodiments. At 1202, the method 1200 includes driving a resonator mass of a gyroscope in a first direction by applying a drive signal to a drive electrode. At 1204, the method 1200 includes applying a test voltage to a quadrature compensation electrode adjacent to the resonator mass. At 1206, the method 1200 includes determining a phase difference between a first drive reference signal and an output signal of the gyroscope based on a change in the output signal during application of the test voltage. At 1208, the method 1200 includes compensating for the phase difference between the demodulation signal and the output signal of the gyroscope.

In some embodiments, a method includes driving a resonator mass of a gyroscope in a first direction by applying a first drive signal to a drive electrode and applying a test voltage to a quadrature compensation electrode adjacent to the resonator mass. The method includes determining a phase difference between a first drive reference signal and an output signal of the gyroscope based on a change in the output signal during application of the test voltage and compensating for the phase difference between the drive signal and the output signal of the gyroscope.

In some embodiments, a device includes a gyroscope and a demodulator having a first input coupled to the gyroscope, a second input, and an output. The device includes delay calculator coupled to an output of the demodulator and a delay compensation circuit coupled to the delay calculator and the second input of the demodulator.

In some embodiments, a gyroscope sensor unit includes a quadrature driver configured to output a quadrature test signal and a sensor electrode configured to generate a raw output signal. The gyroscopic sensor unit includes a demodulator configured to receive the raw output signal and a drive reference signal and to generate a demodulated signal based on the drive reference signal and the raw output signal. The gyroscopic sensor unit includes a delay calculator configured to calculate a phase drift value between the demodulated signal and the drive reference signal based on changes in the demodulated signal during output of the quadrature test signal.

Various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a gyroscope; and
a quadrature compensation driver coupled to the gyroscope, the quadrature compensation driver configured to apply a test signal to the gyroscope during a testing period, applying the test signal during the testing period to the gyroscope includes applying a first phase of the test signal with a first polarity during a first period of the testing period, reversing the test signal to a second polarity opposite to the first polarity, and applying a second phase of the test signal with the second polarity during a second period of the testing phase following the first period.

2. The device of claim 1, further comprising:
a demodulator coupled to the gyroscope; and
a delay calculator coupled to the demodulator.

3. The device of claim 2, further comprising a delay compensation circuit coupled to the delay calculator and the demodulator.

4. The device of claim 3, further comprising a drive voltage supply coupled to the gyroscope and the delay compensation circuit.

5. The device of claim 4, wherein the drive voltage supply is configured to provide a first drive voltage to the gyroscope and a first drive reference signal to the delay compensation circuit, the delay compensation circuit is configured to provide the first drive reference signal to a first input of the demodulator, and the delay calculator is configured to calculate a phase difference value between an output signal of the demodulator and the first drive reference signal during application of the test signal to the gyroscope.

6. The device of claim 5, wherein a second input of the demodulator is coupled to the gyroscope.

7. The device of claim 5, wherein the delay compensation circuit is configured to delay the first drive reference signal by the phase difference value to generate a second drive reference signal.

8. The device of claim 7, wherein the gyroscope includes sense electrodes configured to generate a raw output signal.

9. The device of claim 7, wherein the delay calculator calculates the phase difference value based on a difference in the output signal of the demodulator between the first phase and the second phase.

10. A method, comprising:
driving a resonator mass of a gyroscope in a first direction by applying a first drive signal to a drive electrode;
applying a test voltage to a quadrature compensation electrode adjacent to the resonator mass;
determining a phase difference between a first drive reference signal and an output signal of the gyroscope based on a change in the output signal during application of the test voltage;
generating a raw output signal from the gyroscope;

generating the output signal by performing coherent demodulation between the raw output signal and a second drive reference signal based on the first drive reference signal; and compensating for the phase difference between the first drive reference signal and the output signal of the gyroscope, and compensating for the phase difference includes generating the second drive reference signal by delaying the first drive reference signal by the phase difference.

11. The method of claim 10, wherein the raw output signal represents oscillation of the resonator mass in a second direction transverse to the first direction.

12. The method of claim 11, wherein the output signal corresponds to a component of the raw output signal representing rotation of the resonator mass around a third direction transverse to the first direction and the second direction.

13. The method of claim 10, wherein determining the phase difference includes determining a test component of a quadrature component of the output signal.

14. The method of claim 13, wherein determining the phase difference further includes dividing the change by double the test component.

15. A method, comprising:

when oscillating a resonator mass by driving the resonator mass, applying a test voltage to a quadrature compensation electrode adjacent to the resonator mass; and reversing polarity of the test voltage during application of the test voltage to the quadrature compensation electrode.

16. The method of claim 15, wherein reversing the polarity of the test voltage during the application of the test voltage to the quadrature compensation electrode further includes:

applying a first test voltage with a first polarity and a magnitude; and applying a second test voltage with a second polarity and the magnitude, the second polarity being reverse to the first polarity.

17. The method of claim 15, further includes measuring an output signal of a gyroscope before and after reversing the polarity of the test voltage.

18. The method of claim 17, further comprises:

determining a test component of a quadrature component of the output signal; and determining a change in the output signal after reversing the polarity of the test voltage.

19. The method of claim 18, further comprises dividing the change in the output signal after reversing the polarity of the test voltage.

20. The method of claim 19, wherein the test component corresponds to a portion of the quadrature component resulting from the test voltage.

* * * * *